United States Patent [19]
Priestly

[11] Patent Number: 4,626,837
[45] Date of Patent: Dec. 2, 1986

[54] DISPLAY INTERFACE APPARATUS
[75] Inventor: Ernest A. Priestly, Santa Clara, Calif.
[73] Assignee: Wyse Technology, San Jose, Calif.
[21] Appl. No.: 552,755
[22] Filed: Nov. 17, 1983
[51] Int. Cl.[4] .......................... G09G 1/06; G09G 1/14
[52] U.S. Cl. ..................................... 340/723; 340/747; 340/749; 340/814; 358/183; 358/149
[58] Field of Search ............... 340/716, 721, 723, 724, 340/726, 747, 749, 798, 799, 814, 703, 745; 358/149, 183, 22

[56] References Cited
U.S. PATENT DOCUMENTS

| | | | |
|---|---|---|---|
| 4,012,592 | 3/1977 | Ricard | 340/749 |
| 4,163,229 | 7/1979 | Bodin et al. | 340/790 |
| 4,228,430 | 10/1980 | Iwamura et al. | 340/723 |
| 4,249,211 | 2/1981 | Baba et al. | 358/183 |
| 4,338,597 | 7/1982 | Steiner et al. | 340/814 |
| 4,342,095 | 7/1982 | Goodman | 340/799 |
| 4,346,407 | 8/1982 | Baer et al. | 358/149 |
| 4,490,797 | 12/1984 | Staggs et al. | 340/703 |
| 4,503,429 | 3/1985 | Schreiber | 340/747 |
| 4,531,120 | 7/1985 | Brownell, Jr. et al. | 340/745 |

Primary Examiner—Marshall M. Curtis
Assistant Examiner—Donna Angotti
Attorney, Agent, or Firm—Limbach, Limbach & Sutton

[57] ABSTRACT

An apparatus for interfacing externally generated display data with a display terminal so that the externally generated data can be displayed on the display terminal, the apparatus including means for storing the externally generated display data, means responsive to the display control signals of the display terminal for generating addresses for accessing the storage means, wherein the access addresses are in synchronism with the display control signals, and means for logically combining the internally generated display data and the synchronized externally generated display data.

2 Claims, 4 Drawing Figures

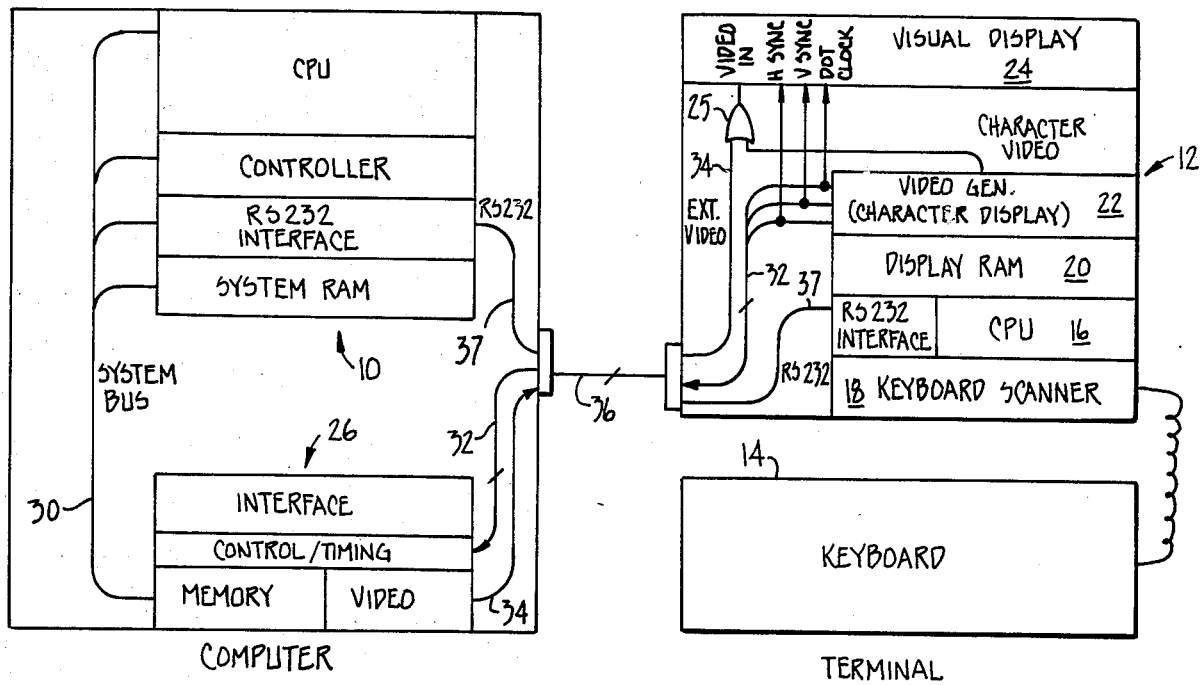
FIG._1.
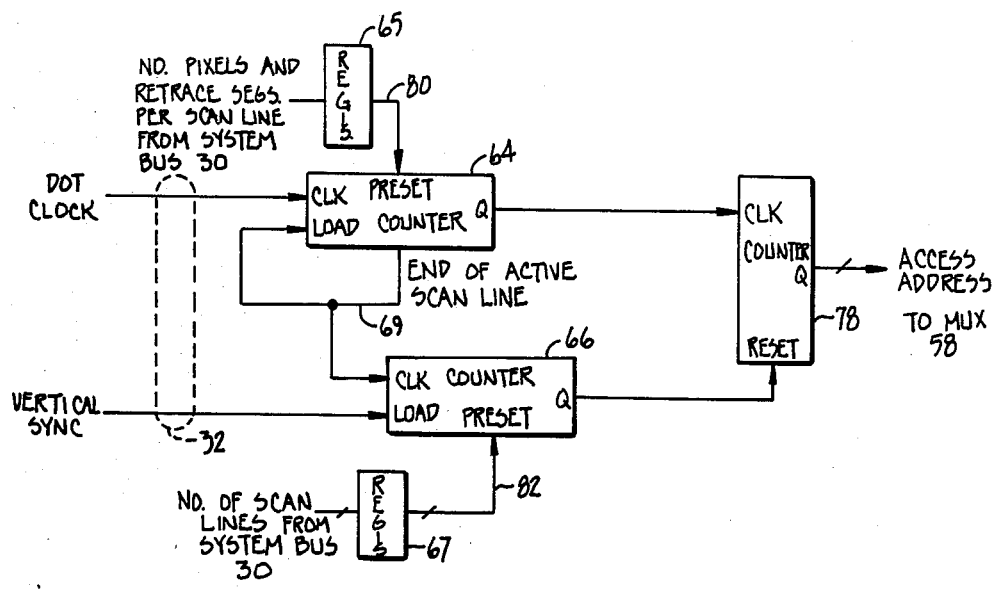
FIG._4.

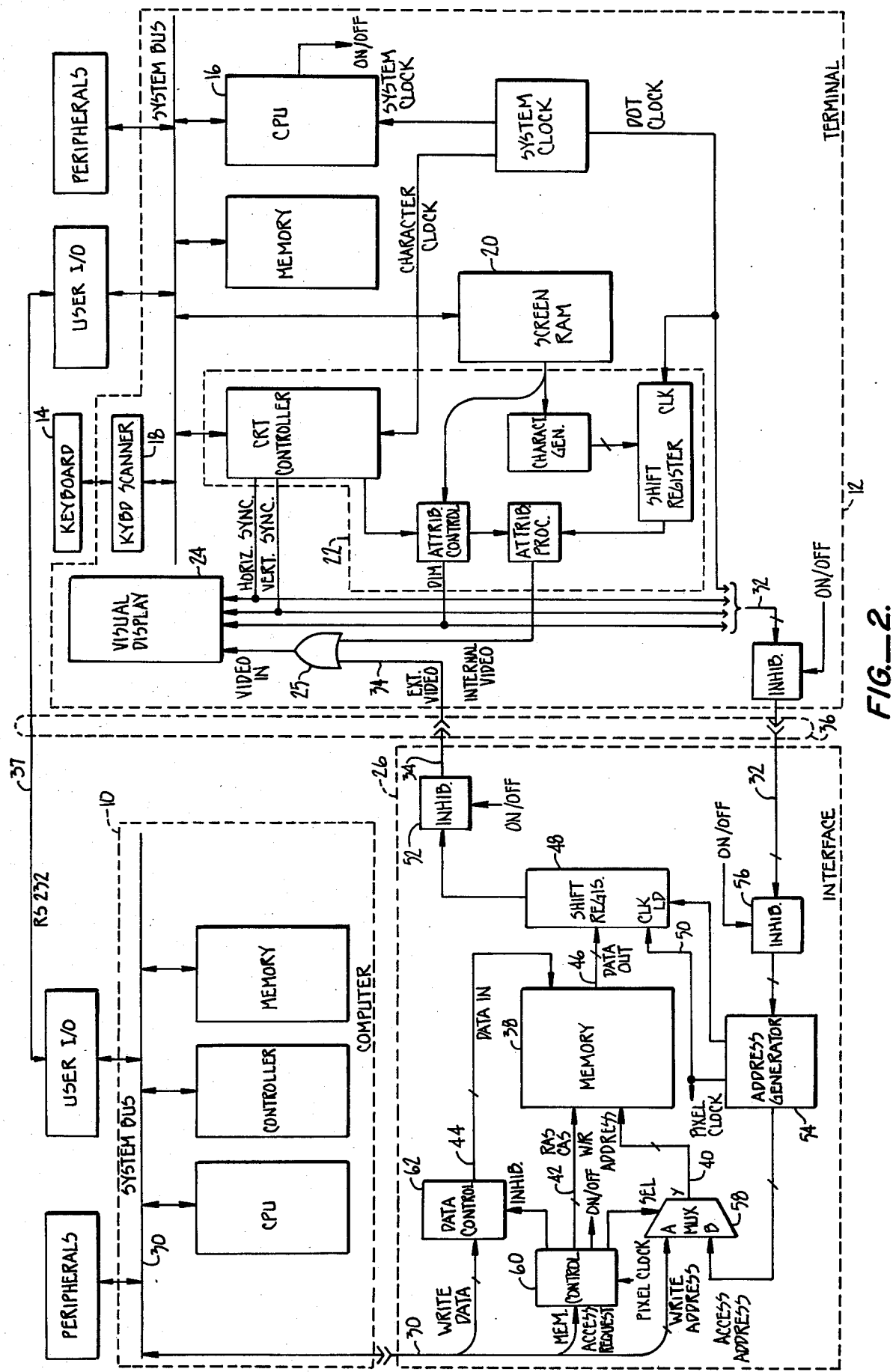
FIG._2.

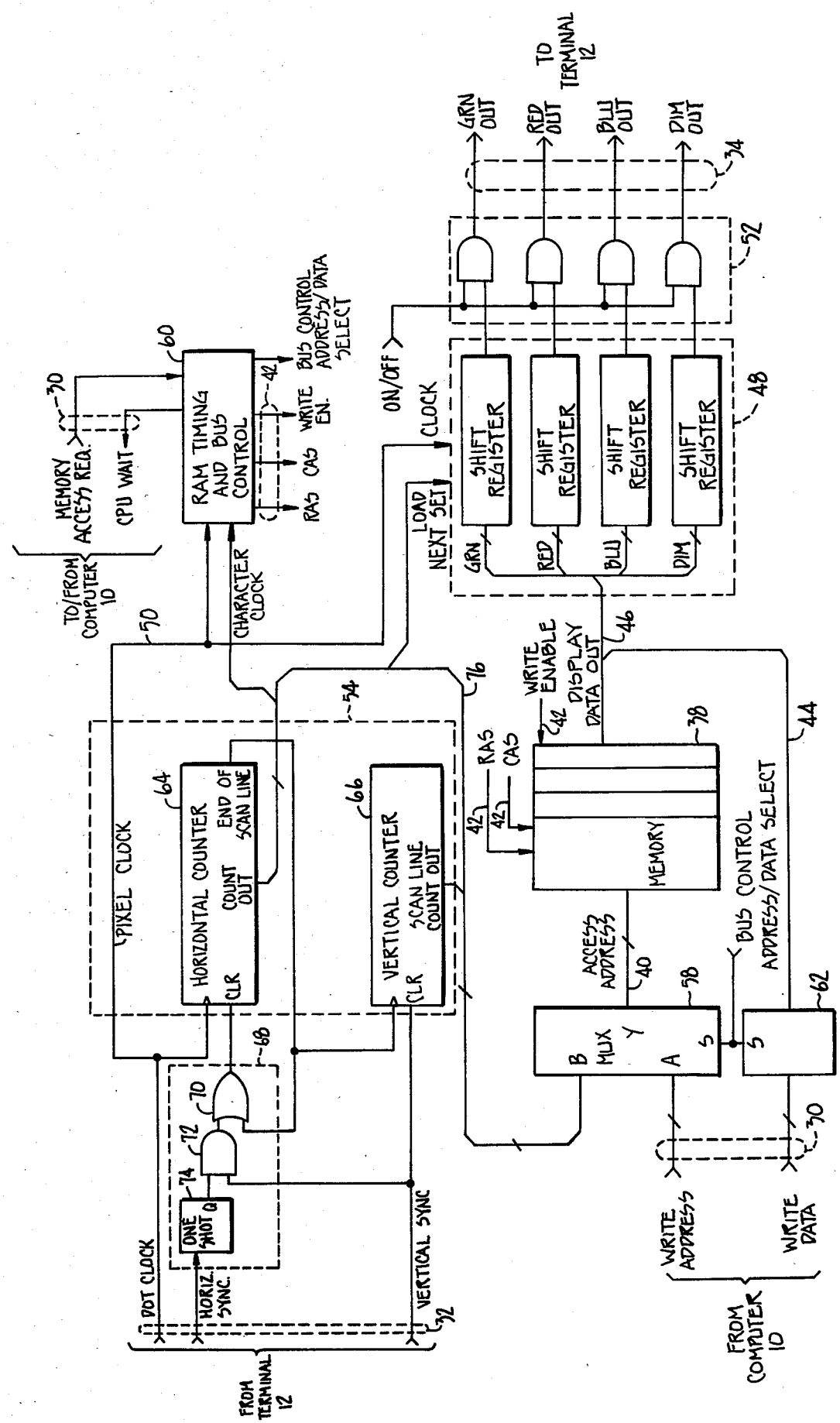
FIG._3.

DISPLAY INTERFACE APPARATUS

DESCRIPTION

1. Technical Field

The present invention is directed generally to display systems, and more particularly to an apparatus for interfacing externally generated data to a display terminal.

2. Background Art

With the recent advances in integrated circuit and related technologies there has been an explosion in the number of computer and computer peripheral products on the market. In the computer peripheral products area there are numerous data terminals on the market, each having its own distinctive features. In a related area, specialized applications, such as graphics processors, have become widely available. Unfortunately, in both of these product areas, the displaying of externally generated data is not a simple or inexpensive matter. This is because the operating characteristics of these products differ from manufacturer to manufacturer such that display information cannot be passed directly between devices. Typically, additional hardware is required to permit such data transfer. However, this hardware can usually only be used on a particular data terminal or graphics processor. This is because the hardware is designed with the operating characteristics of the particular data terminal, or graphics processor, in mind.

Thus, there is a need for a device which will permit external data to be interfaced onto a data terminal, graphics processor, or the like, regardless of the operating characteristics thereof. Preferably, with such a device virtually any data terminal should be enabled to display graphics information from a graphics processor, and vice versa, with little or no modification.

DISCLOSURE OF INVENTION

The foregoing and other problems of prior art data terminals, display devices, and the like, are overcome by the present invention of an apparatus for interfacing a first source of visual display data to a terminal, wherein the first source provides first visual display data and the terminal includes visual display means which display second display data in synchronism with display control signals generated by the terminal. The apparatus includes access signal generating means, storage means, and combining means. The access signal generating means are responsive to the display control signals and generate accessing signals which are in synchronism with the display control signals. The storage means hold the first visual display data. In response to the accessing signals, the storage means provide the first visual display data to the combining means. The combining means receive the second visual display data from the terminal and the first visual display data from the storage means. The first and second visual display data are combined thereby and supplied, in synchronism, to the visual display means.

The present invention therefore receives display control signals from the terminal, supplies externally generated display data in synchronism with the display control signals, and combines the synchronized externally generated signals with the terminal-generated visual display signals. As such, the present invention permits virtually any data terminal to display graphics information from a graphics processor, and vice versa, with little or no modification.

It is therefore an object of the present invention to provide an interface apparatus which synchronizes externally generated visual display data to the display control signals of a terminal upon which the externally generated visual display data are desired to be displayed.

It is another object of the present invention to provide a device for interfacing display information onto a display terminal wherein the display information is held in storage and read-out in synchronism with display control signals from the terminal upon which the display information is to be displayed.

It is a further object of the present invention to provide an apparatus for interfacing externally generated display data onto a terminal, wherein the terminal supplies display control signals and display data generated by the terminal are displayed in synchronism with the display control signals, and further wherein the externally generated display data are stored in a memory, access signals are generated as a function of the display control signals, and the access signals are applied to the memory to read out the externally generated display data from the memory, so that the externally generated display data is supplied to the terminal in synchronism with the display control signals, the apparatus further providing means for logically ORing the internally generated display data with the synchronized externally generated display data.

These and other objective, features and advantages of the present invention will be more readily understood upon consideration of the following detailed description and accompanying drawings.

BRIEF DESCRIPTION OF THE DRAWINGS

FIG. 1 illustrates the functional relationship between the present invention, a terminal, and a source of externally generated visual data.

FIG. 2 is a simplified functional block diagram of the present invention which illustrates signal flow in the external data source, the present invention, and a display terminal.

FIG. 3 is a more detailed functional block diagram of the present invention.

FIG. 4 illustrates an alternative embodiment of the address generator of the present invention.

DETAILED DESCRIPTION OF THE INVENTION

FIG. 1 illustrates the relationship of the present invention to a source of externally generated display data and to a terminal which has a display upon which it is desired that the externally generated display information be displayed. In the figure, the source of externally generated display data is a computer 10 and the terminal is an alphanumeric terminal 12.

In order to simplify the description herein, the present invention will be described in the context of interfacing a computer to an alphanumeric terminal. It is to be understood that the present invention is equally applicable to other sources of externally generated display data, such as a graphics processor or data terminal, and equally applicable to other forms of terminals having visual displays, such as those found in graphics processors.

Terminal 12 receives alphanumeric information from a keyboard 14. The CPU 16 controls keyboard scanner 18 in the sensing of the keys being depressed by the user, and stores the corresponding alphanumeric information in display RAM 20. Video generator 22, under control of CPU 16, reads the alphanumeric information from display RAM 20, converts the alphanumeric information into character display information, and supplies this character display information along with display control signals to visual display 24. There, the characters corresponding to the alphanumeric information in display or screen RAM 20 are visually displayed.

In the typical alphanumeric terminal, the character display information is supplied from the video generator 22 to the display 24 via an unbroken signal path. In accordance with the present invention, the character display information is received by circuitry 25 which logically combines the information with display information from the external source. This logically combined information is then supplied to display 24.

Computer 10 can be a general purpose computer, such as a personal computer, or a special purpose computer, such as a graphics processor, which provides the externally generated display information. As discussed above, this information can be alphanumeric, graphical, or the like.

In accordance with the present invention, an interface 26 is provided which receives display control signals from display terminal 12 and externally generated display data from computer 10, and, in turn, provides externally generated display data which have been synchronized to the display control signals. The synchronized externally generated display data are then logically combined with the internally generated display data by circuit 25.

As shown in FIG. 1, interface 26 is coupled to the computer 10 by way of a connection to the computer's system bus 30. Typically, this connection can be made through system bus expansion connectors provided in many computer systems to allow connection of peripherals. The computer 10 can thus access interface 26 as if it were another peripheral or external memory.

Interface 26 receives the display control signals from video generator 22 via lines 32. In the preferred embodiment, the display signals provided by video generator 22 include a horizontal sync signal, a vertical sync signal, and a dot clock.

Interface 26 supplies the synchronized externally generated display data to circuit 25 via line 34.

In the usual computer system configuration, a serial data format interconnect, e.g. RS 232, is provided between the central processing unit and alphanumeric terminal. The terminal can then exchange data with the central processing unit for processing or display. Typically, a line for accessing the RS 232 channel is brought out to connectors on the central processing unit chassis and on the terminal chassis, and connection between the connectors is made by way of a cable. Often, there are several unused pins on the connectors.

In relation to the present invention, these extra pins can be used to carry the display control signals and the synchronized externally generated display data between the interface 26 and the terminal 12. Thus, a single bundle of wires 36 is shown in FIG. 1 which carries the various signals between the interface 26, the computer 10, and the terminal 12.

Referring to FIG. 2, the interface 26 will be described in greater detail. The elements of interface 26 fall into three functional areas: (1) display data storage, (2) storage access addressing, and (3) writing of display data into the display data storage.

With respect to the display data storage function, a memory 38, such as a random access memory is provided for storing the display data. The memory receives access addresses on line 40, in conjunction with row and column address strobes and write enable signals on line 42, to read data out from or store data into the addressed locations. In FIG. 2, the input data are shown provided to memory 38 on line 44, while the ouput data are shown provided by memory 38 on line 46. It is to be understood, however, that the data input and output lines can be the same line depending upon the type of memory used.

The output data from memory 38 can be in a serial format or parallel format. In FIG. 2, the output data is shown provided in parallel format. Thus, the parallel data are received by shift register 48 and shifted out in serial form in accordance with a clock received on line 50. This serial data stream is then supplied, via a gating circuit 52, to line 34 for logical combination in the data terminal as described above. Gating circuit 52 can be a set of electronic switches, or NAND gates, which respond to an on/off command to inhibit the signal flow to line 34. Thus, when it is desired to turn off the flow of externally generated display data to the data terminal 12, the on/off command to gating circuit 52 will be asserted.

The storage addressing elements include address generator circuitry 54. As described above, visual display control signal, including a horzontal sync, a vertical sync, and a dot clock signal, are supplied by data terminal 12 to interface circuit 26 via line 32. These signals are received by address generator circuit 54 via gating circuit 56. Gating circuit 56 is similar to gating circuit 52 as described above. In response to the visual display control signals, address generator circuit 54 generates a set of access addresses which are synchronized thereto. A pixel clock is supplied on line 50, to control the shifting out of display data from shift register 48.

The above access addresses are applied to memory 38 via multiplexer 58 and line 40. Because the access addresses are synchronized to the display control signals, the externally generated display data in memory 38 are read out and supplied to data terminal 12 during the active video portion of the visual display operation. The image represented by the externally generated display data can thus be displayed on visual display 24 as if it had been generated internally to data terminal 12.

With respect to the writing of data into memory 38, interface 26 is connected to the system bus 30 of computer 10 and receives write data, write addresses, and control signals. The control signals can include a memory access request, an external data off command, and other commands for writing data into memory 38. These control signals are received by control circuit 60.

The write addresses are received by multiplexer 58, and the write data are received by gating circuit 62. Gating circuit 62 is similar to gating circuits 52 and 56 described above and controls the flow of the write data onto data-in line 44. The write data are the externally generated data sought to be displayed on visual display 24. It is to be understood that the write data can take several forms, ranging from graphical to textual.

In the preferred embodiment of the present invention, the memory 38 stores a pixel map of the image to be displayed on the visual display. Thus, the write data supplied by the computer 10 includes data which defines each pixel of the image. For example, where the visual display 24 is a color display, and where a color mapping circuit is interposed in the data output line 46, the information stored in memory 38 can be words which specify the color of the pixel. In response to these words, the color mapping circuit supplies signals to control the blue, green and red color guns in the visual display 24. In a monochrome case, each pixel is defined by a single bit having a logic state of a one or a zero.

Where the visual display 24 is of the raster scanning type, video data are supplied for display in a serial format, and by scan line, from top to bottom. In the preferred embodiment of the present invention, address generator 54 generates a series of consecutive addresses. The computer 10 is programmed to write data into memory 38 so that the display data in memory 38 are read-out in a scan line format and in the order in which the scan lines are to appear on the visual display 24. It is to be understood that other address series can be generated by address generator 54 as a function of the visual display image format, and that the externally generated data will be stored in memory 38 by computer 10 to accomodate such a format.

As discussed above, control circuit 60 receives a number of control signals from computer 10. When a Memory access request is received, control circuit 60 provides a select signal to multiplexer 58 to permit the write addreses from computer 10 to be supplied to memory 38. Additionally, control circuit 60 provides a "wait" signal to computer 10 to signify that memory 38 is currently in a refresh cycle, i.e. is currently supplying display data to the data terminal. Additionally, control circuit 60 supplies row address and column address strobes, RAS and CAS respectively, to memory 38. From FIG. 2 it can be seen that control circuit 60 receives the pixel clock from address generator 54. The pixel clock is used to synchronize the application of the RAS and CAS to access addresses from address generator 54.

Control circuit 60 also receives an external display data disable signal from computer 10. In response to this signal, it issues the on/off command to gating circuits 52 and 56 to thereby inhibit the flow to and from data terminal 12.

Referring to FIG. 3, interface 26 will now be described in greater detail. In FIG. 3, address generator 54 can be seen to include a horizontal counter 64, and a vertical counter 66. Horizontal counter 64 receives the dot clock signal from line 32 at its clock input, and the horizontal sync signal, via a gating circuit 68, at its clear input. Horizontal counter 64 is preferably a presettable counter such as can be formed by cascading binary counters, e.g. part number 74LS161 manufactured by Signetics Corporation of Santa Clara, Calif.

As can be seen from FIG. 3, signals from selected output pins are fed back to gating circuit 68 for use in resetting horizontal counter 64. These output pins are selected to represent a count which corresponds to the end of a horizontal scan line, including segments for the horizontal retrace. Thus, for example, where a scan line is 800 pixels long with 220 segments for horizontal retrace, the output pins are selected to correspond to a count of 1020, thus indicating that an end of scan line condition has been reached.

FIG. 3 shows that the selected outputs are received by an OR gate 70 where the signals are ORed with the horizontal sync signal. As such, either the presence of a horizontal sync signal or the end of scan line signal will clear the horizontal counter 64. It can also be seen that the horizontal sync signal is supplied to OR gate 70 via AND gate 72 and one shot 74, and that the other input to AND gate 72 is provided from the vertical sync. One shot 74 is set to provide a logic one to AND gate 72, whenever the horizontal sync signal is present.

The end of scan line signal from the selected outputs of the horizontal counter are also supplied to OR gate 70 and used to reset the count after each scan line. However, this scan line reset procedure is an open loop configuration and subject to system transient interference. Additionally, the scan line reset procedure does not provide initial synchronization when the system is first powered up. The AND gate 72/one shot 74 structure provides the required synchronization. Thus, when the vertical sync pulse and horizontal sync pulse are coincident, a clear signal will be supplied to horizontal counter 64 to reset the count. This ensures horizontal synchronization once during each frame at the vertical rate, and prevents skewing in the horizontal sync due to transients in the environment.

In operation, horizontal counter will count, at the dot clock rate, through a count corresponding to the number of pixels in a horizontal scan line and retrace segments. At the end of the scan line count, horizontal counter 64 is reset to begin the count anew.

As can be seen from FIG. 3, signals from selected outputs of horizontal counter 64 used to construct the access address for accessing memory 38. See line 76. Where memory 38 is configured to supply data for one pixel with each address applied to it, all bits of the output of horizontal counter 64 will be used to address the memory.

In the preferred embodiment of the present invention, memory 38 defines 32 pixels for each address applied to it. Thus, outputs from horizontal counter 64 corresponding to a count of 32 are selected to form the access address.

Vertical counter 66 receives the end of scan line signal from horizontal counter 64 at its clock input, and the vertical sync signal at its clear input. It counts the number of end of scan line signals from horizontal counter 64 and is reset by the vertical sync signal. As shown in FIG. 3, selected outputs from vertical counter 66 are used to form a part of the access address. In the preferred embodiment of the present invention, these outputs provide the most significant bits of the address. Vertical counter 66 can be constructed from binary counters such as part number 74LS393 manufactured by Signetic Corporation. Thus, in the above described configuration, horizontal counter 64 provides the lesser significant bits of the access address, which bits correspond to pixels within a scan line. Conversely, vertical counter 66 provides the higher order bits of the address, which bits correspond to the particular scan line being read out of memory 38.

In an alternative embodiment, FIG. 4, a master counter 78 is used. There, the clock input to master counter 78 is provided by horizontal counter 64, while the reset input is supplied from vertical counter 66. Horizontal counter 64 is clocked by the dot clock and is preset, via line 80, to provide an end of scan line signal, and a clocking output signal whenever it reaches a count corresponding to the number of pixels output from memory 38 per applied address. The clocking output signal is used to clock master counter 78, while the end of scan line signal is used to clock vertical counter 66. In turn, vertical counter 66 is preset, via line 82, to count up to a number corresponding to the number of scan lines in the visual display 24, whereupon it provides an reset signal to master counter 78. The preset data for line 80 and 82 can orignate from the system bus 30 of computer 10. With this alternate configuration, the address generator can be programmed easily to accomodate different scan line and pixel counts as required by the particular visual display being accessed.

In one embodiment of the present invention the terminal supplies identification data, or alternatively can supply its scan line and pixel count parameters, to the computer 10 over an RS232 link 37. In turn the computer 10 can derive appropriate preset data from these parameters or identification data. This preset data is then loaded into registers 65 and 67 which then supply the preset data to lines 80 and 82, FIG. 4. In this manner the interface can be automatically configured for the terminal to be interfaced to.

Control circuit 60 includes a timing circuit which allocates a period of time during which the address generator 54 is permitted to read out memory 38 and thus provide the externally generated display data to the data terminal 12. Control circuit 60 also allocates a period of time during which the computer 10 is permitted to write into memory 38. As such, control circuit can be a shift register, for example part number 74LS195 manufactured by Signetics Corporation, which is configured to shift a predetermined pattern through itself at the dot clock rate. At the beginning of a cycle, the computer 10 is permitted to make a memory access request. If no request is received, the first half of the two-part memory cycle occurs with no RAS or CAS signals, i.e. nothing is transferred to or from memory.

During the second half of the two-part memory cycle a signal is generated to command the multiplexer 58 to apply the address from address generator 54 to memory 38. On successive shifts, the RAS and then the CAS are supplied to memory 38 to cause display data to be passed to shift register 48 and on to terminal 12.

If the computer 10 makes a memory request, a wait signal is sent to the computer until a memory access has begun. At the beginning of the two-part memory cycle, the multiplexer 58 will apply the computer's (10) write address to memory 38. On subsequent shifts of the 74LS195, the memory (38) timing signals (RAS, CAS, MUX) will be generated in proper sequence.

The write data inhibit, and the external display data inhibit functions as described above can be implemented in control circuit 60 by way of latches, or the like, which are directly written into by computer 10 via system bus 30.

Shift register 48 can be constructed from part number 74LS166 manufactured by Signetics Corporation. FIG. 3 shows a shift register configuration for the color monitor case. There, the display data provided by memory 38 specifies the states of the various color guns. For each address applied to memory 38, a plurality of bits are provided for each color. These bits are loaded, in parallel, into the corresponding shift register. Thereafter, the bits are shifted out serially according to the dot or pixel clock rate.

In operation, interface 26 receives and stores externally generated display data from a source, such as computer 10. These display data stored in accordance with a predetermined addressing scheme.

Interface 26 receives horizontal sync, vertical sync, and dot clock signals from data terminal 12. Address generator 54 generates access addresses in synchronism with these display control signals, and supplies these addresses to memory 38. In response thereto, memory 38 supplies display data located at the access addresses to shift register 48. Shift register 48 then shifts this data out to data terminal 10 in a serial bit stream. Where a color monitor is being accessed in data terminal 12, a serial stream of words is provided, wherein each word includes bits which specify the state for each color per pixel.

The serial display data stream from interface 26 is logically combined, through OR gate 25, with display data generated internal to data terminal 12.

Where the computer 10 can communicate directly with the data terminal 12, for example by way of an RS 232 link, the computer 10 can send a command to the data terminal 12 to blank its internally generated display data. As such, only the externally generated display data will be displayed on visual display 24. Alternatively, where the internally generated display data are not blanked, the externally generated display data will be superimposed thereon.

The present invention, as described above, provides an apparatus which can permit graphics images to be displayed on a raster scan alphanumeric terminal, and vice versa, with little or no modification to the alphanumeric terminal required. The present invention permits an external video generator to operate with different terminals, which terminals can be running at different dot clock rates, horizontal scan rates, and vertical frame rates. The display data supplied via the interface 26 are adapated to video rates required by the host terminal. It is to be understood that the present invention can be used to permit display alphanumeric information on graphics terminals as well.

The terms and expressions which have been employed herein are used as terms of description and not of limitation, and there is no intention, in the use of such terms and expressions, of excluding equivalents of the features shown and described, or portions thereof, it being recognized that various modifications are possible within the scope of the invention claimed.

I claim:

1. An apparatus for interfacing a first source of visual display data to a terminal, wherein the first source provides first visual display data, wherein the terminal includes visual display means for displaying second visual display data in synchronism with display control signals generated by the terminal and including a vertical sync signal, a horizontal sync signal, and a dot clock signal, and wherein the image of the visual display means is collectively formed from a plurality of parallel scan lines, each comprising a predetermined number of pixels and retrace segments, said apparatus comprising:

generating means coupled to the terminal for generating access signals as a function of the display control signals, wherein the access signals include access addresses and access control signals, wherein said generating means includes counting means responsive to the dot clock signal and the vertical sync signal for maintaining a count that is incremented in accordance with the dot clock signal and is reset in accordance with the vertical sync signal, wherein said counting means includes a first counter responsive to the dot clock signal for counting up to a quantity corresponding to said predetermined number of pixels and retrace segments, wherein the count of said first counter is automatically reset when said predetermined number is reched, wherein said first counter includes means responsive to both the horizontal and vertical sync signals for initializing the count in said first counter, and also includes a second counter coupled to said first counter and responsive to the vertical sync signal for counting the number of times said first counter reaches said predetermined number, wherein the count of said second counter is reset in accordance with the vertical sync signal, and wherein the count from said first counter provides the portion of the access address by which data for pixels of each scan line is addressed in said storage means and the count from said second counter provides the portion of the access address by which a particular scan line is addressed in said storage means;

storage means coupled to said generating means for storing the first visual display data from the first source and for supplying the first visual display data in accordance with the access signals and in synchronism with the display control signals, wherein said storage means is responsive to the access signals for supplying the first visual display data stored at the access address when the access control signals indicate that an access is permitted; and combining means coupled to said storage means and to the terminal for combining and displaying in synchronism on the visual display means the first and second visual display data.

2. An apparatus for interfacing a first source of visual display data to a terminal, wherein the first source provides first visual display data, wherein the terminal includes visual display means for displaying second visual display data in synchronism with display control signals generated by the terminal and including a vertical sync signal, a horizontal sync signal, and a dot clock signal, and wherein the image of the visual display means is collectively formed from a selectable number of parallel scan lines each comprising a selectable number of pixels and retrace segments, said apparatus comprising:

generating means coupled to the terminal for generating access signals as a function of the display control signals, wherein the access signals include access addresses and access control signals, wherein said generating means includes counting means responsive to the dot clock signal and the vertical sync signal for maintaining a count that is incremented in accordance with the dot clock signal and is reset in accordance with the vertical sync signal, wherein said counting means includes a first counter clocked by the dot clock signal for providing a clocking output signal when the count reaches a selected number of dot clock pulses and for providing an end of scan line signal when the count reaches said selectable number of pixels and retrace segments, includes a second counter clocked by said end of scan line signal for counting said end of scan line signals and for providing a reset signal whenever the count of said second counter reaches said selectable number of parallel scan lines, and includes a third counter coupled to said first and second counters for maintaining a count that is incremented upon each clocking output signal from said first counter and is reset upon each reset signal from said second counter, and wherein the count of said third counter provides the access address;

storage means coupled to said generating means for storing the first visual display data from the first source and for supplying the first visual display data in accordance with the access signals and in synchronism with the display control signals, wherein said storage means is responsive to the access signals for supplying the first visual display data stored at the access address when the access control signals indicate that an access is permitted; and combining means coupled to said storage means and to the terminal for combining and displaying in synchronism on the visual display means the first and second visual display data.

* * * * *